United States Patent
Baldischweiler et al.

(10) Patent No.: US 6,572,024 B1
(45) Date of Patent: Jun. 3, 2003

(54) MEMORY ARRAY WITH ADDRESS SCRAMBLING

(75) Inventors: Michael Baldischweiler, Munich (DE); Stefan Eckardt, Munich (DE)

(73) Assignee: Giesecke & Devrient GmbH, München (DE)

( * ) Notice: Subject to any disclaimer, the term of this patent is extended or adjusted under 35 U.S.C. 154(b) by 0 days.

(21) Appl. No.: 09/959,895

(22) PCT Filed: May 11, 2000

(86) PCT No.: PCT/EP00/04285

§ 371 (c)(1), (2), (4) Date: Jan. 28, 2002

(87) PCT Pub. No.: WO00/70620

PCT Pub. Date: Nov. 23, 2000

(30) Foreign Application Priority Data

May 12, 1999 (DE) .......................................... 199 22 155

(51) Int. Cl.[7] .............................................. G06K 19/06
(52) U.S. Cl. ........................................ 235/492; 235/487
(58) Field of Search .................................. 235/492, 481

(56) References Cited

U.S. PATENT DOCUMENTS 5,765,197 A * 6/1998 Combs ........................ 235/492

OTHER PUBLICATIONS

PCT/EP00/4285, Nov. 5, 2000.*

* cited by examiner

Primary Examiner—Harold I. Pitts
(74) Attorney, Agent, or Firm—Bacon & Thomas, PLLC

(57) ABSTRACT

A memory array includes a plurality of storage cells (10) and a selection device (14) which selects a storage cell (10) for physical access due to a logical address (23) supplied via an address bus (20). The selection device (14) includes a scrambling device (15) which allocates a storage cell (10) in the memory array in predictable fashion by scrambling to a logical address (23) transmitted to one of the selection devices (14), the cell then being physically accessed.

7 Claims, 1 Drawing Sheet

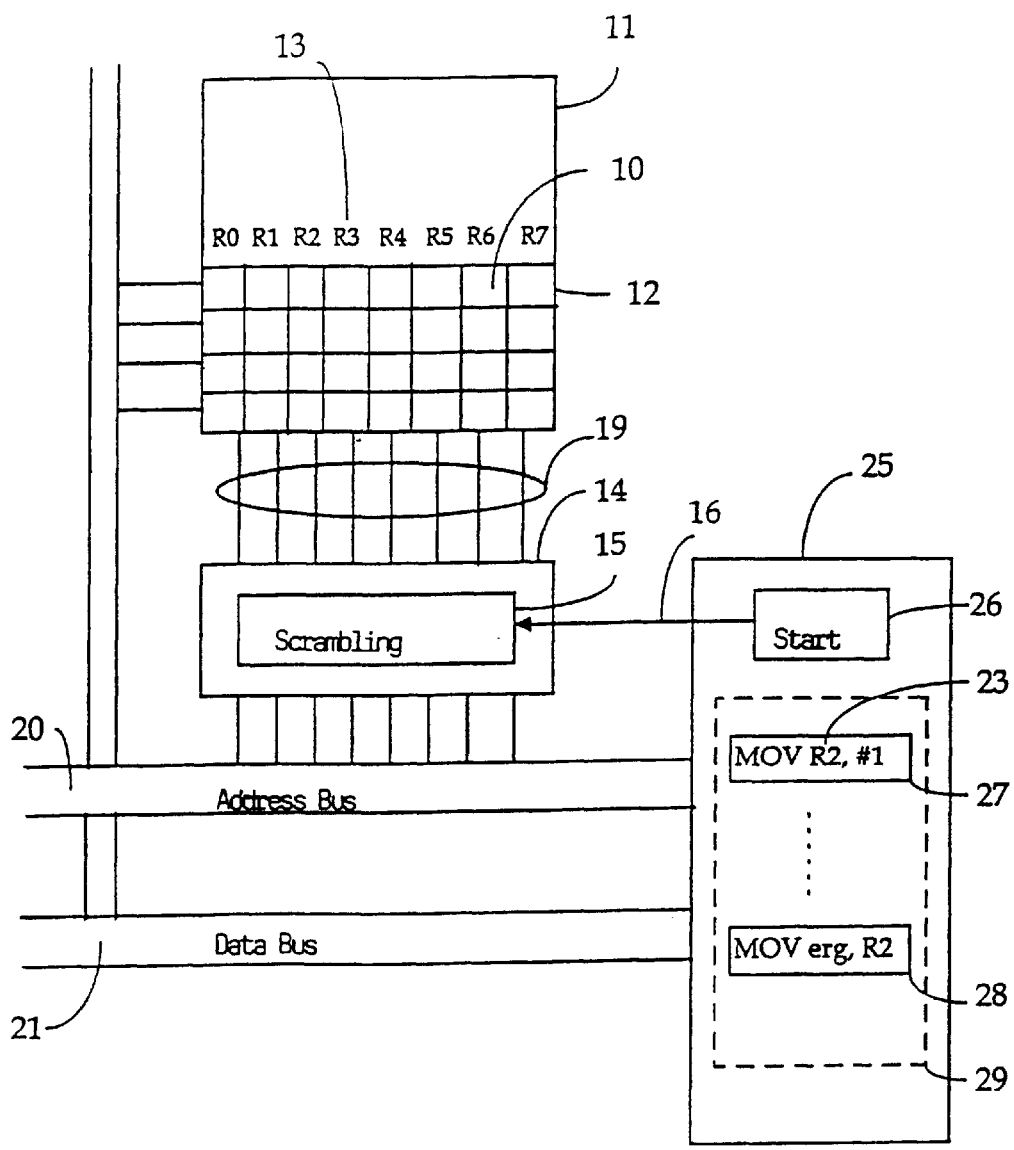
Fig

MEMORY ARRAY WITH ADDRESS SCRAMBLING

BACKGROUND OF THE INVENTION

1. Field of the Invention

This invention relates to a memory array including a plurality of storage cells and a selection device which selects a storage cell based on a logical address supplied via an address bus, and in particular to a memory array in which the selection device includes a scrambling device for scrambling a relationship between logical addresses received from an address bus and physical addresses of the storage cells to which physical access is sought.

2. Description of Related Art

Memory arrays of the type with which the present invention is concerned are part of all common microcomputers and described e.g. in "Chip und System," R. Zaks, SYBEX-Verlag, 1984, pp. 133ff. Basically similar microcomputers are also used in security-relevant applications, e.g. smart card systems for performing financial transactions. However, in these cases additional measures are regularly taken to prevent attaches on security by manipulation of the microcomputer. An example of such a measure is found in "Chipkarten," Karlheinz Fietta, Hüthig Verlag, 1989, pp. 68 to 72. In the TS 1834 chip from THOMSON described therein the address bus and data bus are made invisible from the outside by means of an interface. Another measure for increasing the tamperproofness of the microcomputer can be found in EP 694 846 A1. It is provided here that the data transmitted via the data bus are scrambled possibly several times so that it is impossible to evaluate and thus manipulate the data even if one succeeds in reading them.

Although known measures already guarantee a high degree of security, it is desirable in view of the special importance of the security of microcomputers used in connection with performing financial transactions to improve their tamperproofness further. The invention is based on the problem of providing further measures that achieve this.

SUMMARY OF THE INVENTION

The problem is solved by an array and a method, in which at least one random-access memory present in the microcomputer is preceded by a scrambling device which allocates cells in the memory in unpredictable fashion to the logical addresses transmitted via the address bus, said cells then being actually occupied physically. The inventive memory array thus offers the advantage of making it impossible to manipulate the microcomputer by analyzing the contents of the storage cells of the random-access memory. The logic required for realizing the scrambling device requires little space and ca be readily included in common microcomputer fabrications. Scrambling is preferably repeated regularly in response to defined events.

BRIEF DESCRIPTION OF THE DRAWINGS

The FIGURE shows a memory array of a microcomputer.

DETAILED DESCRIPTION OF THE PREFERRED EMBODIMENTS

The FIGURE shows the memory array of a microcomputer as a detail of the total structure of the latter. Reference number 11 designates a random-access memory, i.e. normally a volatile or increasingly also nonvolatile RAM, which can be divided into a plurality of register banks 12. Each register bank 12 is in turn divided into a defined number of storage cells 10 whose physical position within register bank 12 is clearly designated in each case by allocated address 13. Each storage cell 10 stores information of one byte, register bank 12 usually comprising eight storage cells 10 or an integral multiple thereof.

Memory 11 is connected with microcontroller 25 via data bus 21. The essential function thereof is to execute program instructions 26, 27, 28 stored in usual fashion in a preferably nonvolatile memory device. Execution of the program instructions comprises write and read accessing of memory 11. Data bus 21 is used here to transport the data contents to be written to or read from register banks 12. Memory 11 is further connected via second bus connection 19 with selection device 14. The latter allocates to the data contents transmitted via data bus 21 storage cells 10 in which the data contents are stored physically or from which they are read. For allocation, selection device 14 is likewise connected via a second bus, address bus 20, with microcontroller 25. Selection device 14 obtains therefrom in the form of logical addresses 23 via address bus 20 for each data content the information about which storage cell 10 is to be accessed.

Selection device 14 further comprises scrambling device 15. The latter allocates addresses 13 in memory 11 in unpredictable fashion to logical addresses 23 supplied via address bus 20, said addresses then actually being physically accessed, i.e. written or read. The allocation is preferably redefinable anytime. To trigger a reallocation, scrambling device 15 is connected with microcontroller 25 via control line 16.

With reference to an exemplary instruction sequence the mode of functioning of the above-described array will be explained in the following. Let the instruction sequence consist of two, not necessarily directly consecutive, instructions 27, 28, the first initially laying the value "1" in register R2 and the second calling the content of register R2 again at a later time to write it to a register referred to as a "result register."

First instruction 27 can be represented symbolically as follows: "MOV R2, #1"; where "MOV" stands for the function Move to be performed, R2 designates logically the address of storage cell 10 in memory 11 where the value 1 marked by "#" is to be laid. The corresponding symbolic representation of second instruction 28 is: "MOV erg, R2"; where "MOV" again designates the function Move, "erg" logical address 23 of the result register, R2 a storage cell in memory 11 to be read. Let instruction sequence 27, 28 be part of a program or encompassing instruction sequence 29 not shown in detail which serves as a whole e.g. to realize a function of the microcomputer or a device controlled by the microcomputer. Instruction sequence 29 is in addition preceded by instruction 26 for starting scrambling in selection device 14. Said instruction can be programmed or else formed automatically by the microcontroller in dependence on a triggering event.

Before it begins executing instruction sequence 29, microcontroller 25 executes start instruction 26 and causes via control line 16 the transmission of a signal for starting scrambling device 15. The start signal triggers in selection device 14 a scrambling process by which physical addresses in memory 11 are allocated to logical addresses 23 transmitted via address bus 20. Scrambling expediently causes each address 13 in memory 11 to be allocated to any of the possible logical addresses 23 in each case. The allocation obtained by scrambling is retained for the following execution of program sequence 29, therefore also being valid for instructions 27, 28. When instruction 27 is thus executed, microcontroller 25 transmits logical address R2 to selection device 14 via address bus 20. Selection device 14 then determines allocated storage cell 10 in memory 11. Let it be assumed that scrambling device 15 allocated storage cell 10 with address R5 physically to logical address R2 in memory 11. The selection device therefore determines cell 10 with address R5 as the storage cell allocated to logical address R2 and writes thereto the data content transmitted with instruction 27, i.e. the value 1.

When the execution of instruction sequence 29 follows instruction 18, microcontroller 25 transmits to selection device 14 logical address 23 of the destination register, in this case the address "erg" of the result register, and, in symbolic representation, what is to be loaded into the destination register, namely the content of register R2. Selection device 14 then again determines physical address 13 in memory 11 corresponding to logical address 23 R2, i.e. storage cell R5, and then reads its content via data bus 21.

When program sequence 29 has been executed, it may be immediately provided again that allocation scrambling by scrambling device 15 is triggered, i.e. start instruction 26 transmitted. Even multiple execution of the same program sequence 28 then involves regularly changing occupation of storage cells 10 in memory 11. Alternatively, a restart of scrambling device 15 may be provided only after the execution of several, e.g. a predetermined number of, program sequences 29 or else e.g. only after a restart of microcontroller 25.

The realization of the invention may be varied within wide limits while retaining its underlying idea, namely to make the allocation of physically actually targeted addresses 13 in memory 11 to logical addresses 23 used in the program instructions unpredictable through a scrambling device. Thus, another type of memory with a completely different structure can be chosen, or the scrambling of allocations can relate to groups of storage cells 10. Instead of separate address bus 20, another method can be chosen for transmitting logical addresses 23 to selection device 14. The time and frequency of repeated scrambling by scrambling device 15 can further be triggered by other events and controlled in another way. The array and method are in addition suitable not only for the serial instruction execution taken as a basis for simplicity's sake, but likewise e.g. for program instruction sequences created according to object-oriented concepts.

What is claimed is:

1. A memory array comprising a memory with a plurality of storage cells and a selection device arranged to select a storage cell to be physically accessed based on a logical address supplied to the selection device via an address bus, the selection device comprising a scrambling device arranged to scramble, in response to a trigger, a correspondence between logical addresses supplied to the selection device and storage cells to which the logical addresses are allocated by allocating the storage cells in unpredictable fashion to each of said logical addresses transmitted to the selection device before the allocated storage cell is physically accessed.

2. The memory array according to claim 1, wherein the selection device includes a control input via which the scrambling device can be started.

3. The memory array according to claim 1, wherein the selection device retains an allocation performed by a scrambling process during the execution of an instruction sequence forming a program.

4. The memory array according to claim 1, wherein the scrambling device performs an allocation to logical addresses for all cells in a memory in response to a start signal in each case.

5. The memory array according to claim 1, wherein the memory is a random-access memory.

6. The memory array according to claim 1, wherein the memory is a volatile memory.

7. A method for storing data contents in a memory divided into storage cells, wherein the data to be stored each contain a data content and a logical address supplied to a selection device for designating a storage cell in the memory, comprising the stops of:

scrambling a correspondence between the logical addresses supplied to a selection device and storage cells to which the logical addresses ale allocated by a scrambling procedure;

storing the data in the memory at the address generated by the scrambling procedures; and carrying out said scrambling procedure in response to a trigger so that the scrambling result is not always the same.

* * * * *